United States Patent
Chen et al.

(10) Patent No.: US 11,805,790 B2
(45) Date of Patent: Nov. 7, 2023

(54) ZYMOLYTIC RICE PROTEIN POWDER WITH LOW GRANULAR SENSATION, METHODS FOR PREPARING AND APPLICATION THEREOF

(71) Applicant: WUXI JINNONG BIOTECHNOLOGY CO., LTD, Wuxi (CN)

(72) Inventors: Tianxiang Chen, Wuxi (CN); Qiusheng Yu, Wuxi (CN); Xiangli Ping, Wuxi (CN)

(73) Assignee: WUXI JINNONG BIOTECHNOLOGY CO., LTD, Wuxi (CN)

( * ) Notice: Subject to any disclaimer, the term of this patent is extended or adjusted under 35 U.S.C. 154(b) by 326 days.

(21) Appl. No.: 16/962,843

(22) PCT Filed: Jul. 30, 2019

(86) PCT No.: PCT/CN2019/098291
§ 371 (c)(1),
(2) Date: Jul. 17, 2020

(87) PCT Pub. No.: WO2020/113973
PCT Pub. Date: Jun. 11, 2020

(65) Prior Publication Data
US 2021/0127707 A1    May 6, 2021

(30) Foreign Application Priority Data
Dec. 3, 2018 (CN) .......................... 201811462973.1

(51) Int. Cl.
| A23J 1/12 | (2006.01) |
| A23K 10/30 | (2016.01) |
| A23L 33/185 | (2016.01) |
| A23J 3/14 | (2006.01) |
| A23L 2/66 | (2006.01) |

(52) U.S. Cl.
CPC . *A23J 1/12* (2013.01); *A23J 3/14* (2013.01); *A23K 10/30* (2016.05); *A23L 2/66* (2013.01); *A23L 33/185* (2016.08)

(58) Field of Classification Search
CPC .... A23J 1/12; A23J 3/14; A23K 10/30; A23L 33/185; A23L 2/66
USPC ......................................................... 426/656
See application file for complete search history.

(56) References Cited

U.S. PATENT DOCUMENTS

| 4,990,344 A * | 2/1991 | Euber ........................ A23J 1/12 426/656 |
| 2009/0258954 A1* | 10/2009 | Beck .................... A23K 20/179 435/68.1 |
| 2016/0345611 A1* | 12/2016 | Gonzalez ................ A23L 33/10 |

OTHER PUBLICATIONS

CN-102334646—English Abstract (Year: 2013).*
CN 106509103—English Abstract (Year: 2017).*

* cited by examiner

*Primary Examiner* — Hamid R Badr
(74) *Attorney, Agent, or Firm* — Idea Intellectual Limited; Margaret A. Burke; Sam T. Yip

(57) ABSTRACT

The present invention provides a zymolytic rice protein powder with low granular sensation, and a method for preparing the zymolytic rice protein powder comprising the following steps: (1) pretreatment of rice residue after sugar production; (2) high temperature extrusion pretreatment; (3) refining treatment; (4) wet crushing; (5) controlling zymolysis; (6) terminating zymolysis; (7) microjet treatment; (8) spray drying; (9) subsequent crushing. The protein content of the zymolytic rice protein powder in the present invention is more than 80%; the fat content thereof is less than 3%; the water content thereof is less than 5%; and the nitrogen solubility index thereof is more than 30%. The molecular weight distribution of the soluble protein is as follows: the proportion thereof with a molecular weight of less than 2000 Da is more than 70%.

6 Claims, No Drawings

ZYMOLYTIC RICE PROTEIN POWDER WITH LOW GRANULAR SENSATION, METHODS FOR PREPARING AND APPLICATION THEREOF

CROSS-REFERENCE TO RELATED APPLICATIONS

This application is a 371 application of the International Patent Application No. PCT/CN2019/098291 filed on Jul. 30, 2019, which claims priority from the Chinese patent application No. 2018114629731 filed on Dec. 3, 2018, and the disclosures of which are incorporated herein by reference in their entirety.

FIELD OF THE INVENTION

The invention relates to the field of rice protein, in particular to methods for preparing and applying a zymolytic rice protein powder with low granular sensation.

BACKGROUND OF THE INVENTION

Rice protein powder mainly comes from rice, which contains about 8% protein content. Most of the raw material of rice protein are fermented rice residue from sugar factories and monosodium glutamate factories. The protein in the raw materials is enriched to make the amount of the protein more than 50%. It is one of the most economical and effective ways to use the raw material as the base material for further purification to obtain food grade rice protein powder with more than 80% protein content. The protein in rice residue is mainly water-insoluble gluten. After a long time of high temperature liquefaction and amylase hydrolysis in the pre-working process, denaturation and condensation occur between protein molecules, and cross-linking structure is also formed between protein molecules, fat, cellulose, sugar and other molecules, resulting in further decrease of protein solubility. Currently, main methods for preparing high-purity rice protein powder include alkali-solution and acid-isolation approach, enzyme approach, and solvent approach.

Due to the influence of its own protein properties, the solubility of purified rice protein is low, which greatly limits the application of rice protein. The protein modification method in food industry mainly includes enzyme-based, acid-based, acylation and glycosylation approaches. The degree of hydrolysis in the acid-based approach is not easy to control and would affect the taste at the end. The product safety from acylation approach is questionable. The glycosylation approach requires more carbonhydrate substaces to produce the effect. Therefore, these modification approaches are not applicable at industrial level. As for the enzymatic modification, the reaction conditions are mild and controllable, and the product also has certain functionality, while the protein content is not lowered.

The mechanism of enzymatic modification is to break the original molecular structure by zymolysis, via exposing the hydrophobic group and the hydrophilic group to the surface of the molecule, thereby strengthening the interaction between protein and water by the hydrophilic group, while the protein conformation is changed. Based on the above principles, the physical and chemical properties of the protein are improved.

Most of the existing technologies use a single endopeptidase, and the peptide digestion sites are random. In order to modify the flavor, exopeptidase such as flavorzymes are usually used, and more free amino acids are produced from the hydrolysis process, resulting in poor flavor of the final product. The existing technology pays little attention to the taste of the zymolytic products, and only focus on the degree of hydrolysis which eventually leads to high degree of hydrolysis, bitter taste, fresh taste, and affects the final application of products.

SUMMARY OF THE INVENTION

With respect to the above problems in the existing technology, the present invention provides a preparation method and application for an zymolytic rice protein powder. In the present invention, the protein content of the zymolytic rice protein powder is more than 80%, the fat conetent is less than 3%, the nitrogen solubility index is more than 30%, and the amount of water content is less than 5%. The molecular weight distribution of the soluble protein is as follows: the amount of soluble protein with molecular weight less than 2000 Da is more than 70%.

The technical solution of the present invention is as follows:

A method for preparing a zymolytic rice protein powder with low granular sensation comprises the following steps:

(1) The pretreatment of the rice residue after sugar production: the rice residue after sugar production is used as the raw material, and then pass through a 40 mesh sieve so as to remove the large particular impurities;

(2) High temperature extrusion pretreatment: The rice residue raw material obtained in step (1) is mixed with water and powderized, and the material is pretreated with extrusion.

(3) Refining treatment: adjust pH of the rice residue solution by alkali solution to 7.2-8.0, and then the rice residue solution is treated with solid-liquid separation to obtain purified wet protein residue with more than 80% protein content.

(4) Wet crushing: the wet protein residue is adjusted to a concentration of 10-30 wt %. After the wet crushing treatment, the particle size of the protein is reduced to approximately 100 mesh. After the pressure arc sieve separation, the upper fraction of the protein material solution is crushing by ginding treatment twice, and the lower fraction of the protein material solution is subjected to zymolysis.

(5) Zymolysis control: the protein material solution obtained in step (4) is standardized; the temperature of the material is adjusted to 45-55° C.; the pH is adjusted to 5.5-8.5; and the hydrolysis of the protein is partially controlled by the synergistic action of the compound endopeptidases.

(6) Zymolysis termination: the protease hydrolysate was reacted with a vaporized air and kept at 80-90° C. for 30 minutes to stop the zymolysis.

(7) Microjet treatement: the protease hydrolysate is delivered into the microjet with a pressure of 30-35 MPa, and circulates for 2-4 times, further reducing the particle size of the material to 10-25 μm.

(8) Spray drying: the processed material is dried by spray drying; the air inlet temperature is 180-200° C., the air outlet temperature is 80-100° C., and the water content of the material is reduced to 5% after spray drying.

(9) Crushing: the samples are further crushing aftery spray drying, and are prepared as different particle sizes of products.

The water content in the powderizing process in step (2) is 10-20 wt %; the internal cavity temperature of the extruder is set at 130-160° C. during the extrusion process.

The alkali solution in step (3) is one or more of NaOH, $Na_2CO_3$ and $NaHCO_3$ aqueous solutions, and the alkali solution concentration is 10%.

The mesh number of the pressure arc sieve in step (4) is 80-120 mesh, and the pressure is 0.2-0.4 MPa.

The compound endopeptidases in step (5) are two or more of alkaline protease, neutral protease, acid protease, trypsin and chymotrypsin.

There is provided a method of applying zymolytic rice protein powder with a low granular sensation, which is used for preparing energy bar.

The beneficial technical effects of the present invention are as follows:

The rice protein of the invention has been denatured after high temperature treatment during the sugar manufacturing process. After extrusion treatment, the rice protein undergoes the processes of high temperature, high pressure and shearing treatment, and then a series of complex physical and chemical reactions occur during the process, resulting in the change of the binding force to maintain the third and fourth structures of the protein, the weakening of the interaction force between the protein molecules, and the linear arrangement of protein molecules, which is more favorable to the subsequent zymolysis and the improvement of the sensitivity of zymolysis.

After high temperature treatment, the protein particles are dispersed, and the microjet is a sort of physical crushing method with strong shear force. After the treatment, the protein taste is more smooth and the granular sensation is weak;

The present invention adopts the wet crushing method, and the protein particles are also further refined by the high pressure microjet. The material solution undergoes zymolysis by protease, and two kinds of endopeptidases are used to react respectively. Without the effect of exopeptidases, it can reduce the production of free amino acids and avoid the production of bad flavor. The functional enzymolytic fragments would be obtained through the site-specific zymolysis by specific endopeptidases and controlled zymolysis.

The protein content of the zymolytic rice protein is more than 80%, the fat content is less than 3%, the water content is less than 5%, and the nitrogen solubility index is more than 30%. The molecular weight distribution of the soluble protein is as follows: the amount of soluble protein with molecular weight less than 2000 Da is more than 70%.

The present invention aims at the protein structure in the heat denatured raw material which is difficult to be zymolysed, wherein the zymolysis are promoted by pretreatment. Before zymolysis and combining with certain pretreatment methods through the extrusion, high temperature and shearing reaction, the interaction force between the third and fourth structures of protein molecules is reduced, and the molecular structure of raw protein is fully opened, which is more favorable to the subsequent zymolysis. Increasing the physical shear effect of wet crushing before zymolysis would have a certain effect on reducing the granular sensation of zymolytic protein. The zymolysis further destroys the secondary and tertiary structures of the protein, and the protein molecules would expand from the aggregation state to the disaggregation state so as to improve the solubility of protein. With the increase of hydrolysis degree, the rice protein would unfold, make the internal hydrophilic amino acids exposed, and further increase its solubility.

DETAILED DESCRIPTION

Detailed description to the present invention is provided with drawings and embodiments as follows.

Embodiment 1

A zymolytic rice protein powder with low granular sensation is provided, in which a preparation method for the zymolytic rice protein powder includes steps as follows.

(1) The pretreatment of the rice residue after sugar production: the rice residue after sugar production is used as the raw material, and then pass through a 40 mesh sieve so as to remove the large particular impurities;

(2) High temperature extrusion pretreatment: The rice residue raw material obtained in step (1) is mixed with water and powderized and the water content is adjusted to 20 wt %. The material is pretreated with extrusion (the internal cavity temperature of the extruder is set at 130° C.).

(3) Refining treatment: adjust pH of the rice residue solution by 10 wt % NaOH solution to 7.2 to 8.0, and then the rice residue solution after alkali treatment is performed with solid-liquid separation to obtain purified wet protein residue with more than 80% protein content.

(4) Wet crushing: the wet protein residue is adjusted to a concentration of 30 wt %. After the wet crushing treatment, the particle size of the protein is reduced to approximately 100 mesh. After the pressure arc sieve separation (the mesh number is 80 mesh and the pressure is 0.2 MPa), the upper fraction of the protein material solution is crushing by ginding treatment twice, and the lower fraction of the protein material solution is subjected to zymolysis.

(5) Zymolysis control: the protein material solution obtained in step (4) is standardized; the temperature of the material is adjusted to 45° C.; the pH is adjusted to 5.5, and the hydrolysis of the protein is partially controlled by the synergistic action of the compound endopeptidases (acid protease 0.5 wt %+neutral protease 0.5 wt %) for 3 hours.

(6) Zymolysis termination: the protease hydrolysate was reacted with a vaporized air and kept at 80° C. for 30 minutes to stop the zymolysis.

(7) Microjet treatement: the protease hydrolysate is delivered into the microjet with a pressure of 30 MPa, and circulates for 2 times, further reducing the particle size of the material to 25 μm.

(8) Spray drying: the processed material is dried by spray drying; the air inlet temperature is 200° C., the air outlet temperature is 100° C., and the water content of the material is reduced to 5% after spray drying.

(9) Crushing: the samples are further crushing aftery spray drying, and are prepared as different particle sizes of products. The composition of the final product is shown in Table 1.

Embodiment 2

A zymolytic rice protein powder with low granular sensation is provided, in which a preparation method for the zymolytic rice protein powder includes steps as follows.

(1) The pretreatment of the rice residue after sugar production: the rice residue after sugar production is used as the raw material, and then pass through a 40 mesh sieve so as to remove the large particular impurities;

(2) High temperature extrusion pretreatment: The rice residue raw material obtained in step (1) is mixed with water and powderized and the water content is adjusted to 15 wt %. The material is pretreated with extrusion (the internal cavity temperature of the extruder is set at 150° C.).

(3) Refining treatment: adjust pH of the rice residue solution by 10 wt % alkali solution (mix NaOH and Na$_2$CO$_3$ with a ratio of 1:1) to 7.5, and then the rice residue solution after alkali treatment is performed with solid-liquid separation to obtain purified wet protein residue with more than 80% protein content.

(4) Wet crushing: the wet protein residue is adjusted to a concentration of 20 wt %. After the wet crushing treatment, the particle size of the protein is reduced to approximately 100 mesh. After the pressure arc sieve separation (the mesh number is 100 mesh and the pressure is 0.3 MPa), the upper fraction of the protein material solution is crushing by ginding treatment twice, and the lower fraction of the protein material solution is subjected to zymolysis.

(5) Zymolysis control: the protein material solution obtained in step (4) is standardized; the temperature of the material is adjusted to 55° C.; the pH is adjusted to 7.0; and the hydrolysis of the protein is partially controlled by the synergistic action of the compound endopeptidases (alkaline protease 0.5 wt %+neutral protease 0.5 wt %) for 3 hours.

(6) Zymolysis termination: the protease hydrolysate was reacted with a vaporized air and kept at 85° C. for 30 minutes to stop the zymolysis.

(7) Microjet treatement: the protease hydrolysate is delivered into the microjet with a pressure of 32 MPa, and circulates for 3 times, further reducing the particle size of the material to 18 μm.

(8) Spray drying: the processed material is dried by spray drying; the air inlet temperature is 190° C., the air outlet temperature is 90° C., and the water content of the material is reduced to 5% after spray drying.

(9) Crushing: the samples are further crushing aftery spray drying, and are prepared as different particle sizes of products. The composition of the final product is shown in Table 1.

Embodiment 3

A zymolytic rice protein powder with low granular sensation is provided, in which a preparation method for the zymolytic rice protein powder includes steps as follows.

(1) The pretreatment of the rice residue after sugar production: the rice residue after sugar production is used as the raw material, and then pass through a 40 mesh sieve so as to remove the large particular impurities;

(2) High temperature extrusion pretreatment: The rice residue raw material obtained in step (1) is mixed with water and powderized and the water content is adjusted to 10 wt %. The material is pretreated with extrusion (the internal cavity temperature of the extruder is set at 160° C.).

(3) Refining treatment: adjust pH of the rice residue solution by 10 wt % alkali solution (mix NaOH, Na$_2$CO$_3$ and NaHCO$_3$ with a ratio 1:1:1) to 8.0, and then the rice residue solution after alkali treatment is performed with solid-liquid separation to obtain purified wet protein residue with more than 80% protein content.

(4) Wet crushing: the wet protein residue is adjusted to a concentration of 10 wt %. After the wet crushing treatment, the particle size of the protein is reduced to approximately 100 mesh. After the pressure arc sieve separation (the mesh number is 120 mesh and the pressure is 0.4 MPa), the upper fraction of the protein material solution is crushing by ginding treatment twice, and the lower fraction of the protein material solution is subjected to zymolysis.

(5) Zymolysis control: the protein material solution obtained in step (4) is standardized; the temperature of the material is adjusted to 50° C.; the pH is adjusted to 8.5; and the hydrolysis of the protein is partially controlled by the synergistic action of the compound endopeptidases (alkaline protease 0.5 wt %+trypsin 0.2 wt %+chymotrypsin 0.2 wt %) for 3 hours.

(6) Zymolysis termination: the protease hydrolysate was reacted with a vaporized air and kept at 90° C. for 30 minutes to stop the zymolysis.

(7) Microjet treatement: the protease hydrolysate is delivered into the microjet with a pressure of 35 MPa, and circulates for 4 times, further reducing the particle size of the material to 10 μm.

(8) Spray drying: the processed material is dried by spray drying; the air inlet temperature is 180° C., the air outlet temperature is 80° C., and the water content of the material is reduced to 5% after spray drying.

(9) Crushing: the samples are further crushing aftery spray drying, and are prepared as different particle sizes of products. The composition of the final product is shown in Table 1.

TABLE 1

| | Protein Content (g/100 g) | Fat Content (g/100 g) | molecular weight less than 2000 Da |
|---|---|---|---|
| Embodiment 1 | 81.5 | 2.3 | 70.2 |
| Embodiment 2 | 83.2 | 1.8 | 72.3 |
| Embodiment 3 | 85.8 | 1.4 | 73.8 |

According to the table 1, the protein content of the zymolytic rice protein powder in the present invention is more than 80%, the fat conetent is less than 3%, and the amount of water content is less than 5%. The molecular weight distribution of the soluble protein is as follows: the amount of soluble protein with molecular weight less than 2000 Da is more than 70%.

Embodiment 4

A zymolytic rice protein powder prepared in embodiment 1 is mixed with the compound stabilizer (carrageenan: xanthan gum:guar gum=2:1:1), and the compound emulsifier (monoglyceride:polyglycerol fatty acid ester:sucrose ester=1:1:1) in a proportion of 10:1.5:1, and add appropriate amount of citric acid and rice syrup to adjust the proportion of sweet and acid, and then is configured to prepare a beverage with 10% zymolytic rice protein. The performance of the beverage is shown in Table 2.

Embodiment 5

A zymolytic rice protein powder prepared in embodiment 2 is mixed with the compound stabilizer (carrageenan:guar gum=2:1), and the compound emulsifier (monoglyceride:polyglycerol fatty acid ester:sucrose ester=1:1:1) in a proportion of 10:1:1, and add appropriate amount of citric acid and rice syrup to adjust the proportion of sweet and acid, and then is configured to prepare a beverage with 10% zymolytic rice protein. The performance of the beverage is shown in Table 2.

Embodiment 6

A zymolytic rice protein powder prepared in embodiment 3 is mixed with the compound stabilizer (carrageenan:xanthan gum:guar gum=2:1:1), and the compound emulsifier (monoglyceride:polyglycerol fatty acid ester:sucrose ester=1:1:1) in a proportion of 10:1:1, and add appropriate amount of citric acid and rice syrup to adjust the proportion of sweet and acid, and then is configured to prepare a beverage with 10% zymolytic rice protein. The performance of the beverage is shown in Table 2.

TABLE 2

|  | Taste preference score | Granular sensation |
| --- | --- | --- |
| Embodiment 4 | 8.5 | 3.0 |
| Embodiment 5 | 8.8 | 2.5 |
| Embodiment 6 | 9.0 | 2.0 |

Note: The taste results were evaluated by 10 trained sensory assessors. There is no similar product on the market, therefore, there is no control group. The full score of taste preference is 10, and the granular sensation is 1-10 from low to high.

Embodiment 7

The zymolytic rice protein powder prepared in embodiment 3 is used as the main protein source of the energy bar, and the preparation method of the energy bar is as follows:
(1) Preparation of protein extrusion particles: 75 parts of zymolytic rice protein powder, 20 parts of rice flour, 4 parts of fructose syrup, 1 part of edible salt are fully stirred and evenly mixed, and adjusted with the water content, and then put into the extruder with the increase of the temperature gradient, followed by expanding and cutting into shape to prepare protein particles;
(2) Stir 15 parts of cream slowly, and continue to add 10 parts of fructose syrup and 10 parts of cream;
(3) Stir until the product with moderate soft and hard, add the extruded zymolytic rice protein particles and expanded oatmeal, and continue to mix evenly;
(4) Feed into the mould and roller press to extrude the product;
(5) The extruded products can be sent to the dryer cooling tunnel to control the final water activity of the products.

Performance test for the energy bar: 8.0 for tests preference score, 2.0 for granular sensation and with crispy taste. Note: The taste results were evaluated by 10 trained sensory assessors. There is no similar product on the market, therefore, there is no control group. The full score of taste preference is 10, and the granular sensation is 1-10 from low to high.

Embodiment 8

The zymolytic rice protein powder prepared in embodiment 3 is applied to animal feed, the formula is as follows: 40% zymolytic rice protein powder, 18% corn powder, 25% expanded soybean powder, 10% sugar powder, 4% salt, 3% dicalcium phosphate.

What is claimed is:

1. A method for preparing a zymolytic rice protein powder with low granular sensation, the zymolytic rice protein powder comprises soluble proteins, wherein more than 70% of the soluble proteins has a molecular weight less than 2000 Da, the method comprising:
    (1) pretreatment of a rice residue after sugar production: using the rice residue as a first raw material, and sieving by 40 mesh so as to remove large particular impurities to obtain a second raw material;
    (2) high temperature extrusion pretreatment: mixing the second raw material obtained in step (1) with water with a water content of 10-20 wt. %;
    performing the extrusion pretreatment in an extruder at a temperature of 130-160° C. to obtain a rice residue solution;
    (3) refining treatment: adjusting the pH of the rice residue solution to 7.2-8.0 by an alkali solution; separating the rice residue solution by a solid-liquid separation to obtain a-wet protein residue with more than 80% protein content;
    (4) wet crushing: adjusting the wet protein residue to a concentration of 10-30 wt. %; performing a wet classification and a first grinding treatment to obtain a protein material solution; wherein particles of the protein material solution are approximately 100 mesh; separating by a pressure arc sieve to obtain an upper fraction of the protein material solution and a lower fraction of the protein material solution, wherein the upper fraction of the protein material solution is crushed by a second grinding treatment and the lower fraction of the protein material solution is subjected to zymolysis;
    (5) zymolysis control: standardizing the lower fraction of the protein material solution obtained in step (4); adjusting the temperature of the protein material solution to 45-55° C., adjusting the pH of the protein material solution to 5.5-8.5, and performing a partial protein hydrolysis on the protein material solution by a synergistic action of compound endopeptidases to obtain a protein hydrolysate;
    (6) zymolysis termination: keeping the protein hydrolysate at 80-90° C. for 30 minutes so as to stop the zymolysis;
    (7) microjet treatment: delivering the protein hydrolysate into a microjet with a pressure of 30-35 MPa, and repeating for 2 to 4 times to obtain a first processed material, wherein the particle size of the first processed material is from 10 to 25 μm;
    (8) spray drying: drying the first processed material by spray drying with the air inlet temperature ranging from 180-200° C. and the air outlet temperature ranging from 80-100° C. to obtain a sample; wherein the water content of the sample is 5% after the spray drying;
    (9) crushing: crushing the sample after the spray drying, wherein the sample is configured to prepare products comprising soluble proteins, wherein more than 70% of the soluble proteins having a molecular weight less than 2000 Da.

2. The method of claim 1, wherein the internal cavity temperature of the extruder is set at 130° C. during said extrusion.

3. The method of claim 1, wherein the alkali solution in step (3) includes one or more of NaOH, $Na_2CO_3$ and NaHCO₃ aqueous solutions or combination thereof, and the concentration of the alkali solution is 10%.

4. The method of claim 1, wherein the mesh number of the pressure arc sieve in step (4) is from 80 to 120 mesh, and the pressure is from 0.2 to 0.4 MPa.

5. The method of claim 1, wherein the compound endopeptidase in step (5) includes two or more of alkaline protease, neutral protease, acid protease, trypsin and chymotrypsin, or any combination thereof.

6. A method for applying the zymolytic rice protein powder with low granular sensation prepared by the method of claim 1, comprising:
    using the zymolytic rice protein powder, an emulsifier, and a stabilizer to prepare a functional beverage, an energy bar, an animal feed and a pet food;
    wherein the stabilizer is selected from the group consisting of a carrageenan, a xanthan gum, a guar gum and combinations thereof; and
    wherein the emulsifier is selected from the group consisting of a monoglyceride, a polyglycerol fatty acid ester, a sucrose ester and combinations thereof.

\* \* \* \* \*